United States Patent Office 2,882,238
Patented Apr. 14, 1959

2,882,238

BARIUM PHOSPHATE PHOSPHOR

Yasuo Uehara and Yoshimasa Kobuke, Tokyo, and Hiroshi Tomishima, Yokohama, Japan, assignors to Tokyo Shibaura Electric Co., Ltd., Kawasaki-shi, Japan No Drawing. Application May 17, 1954
Serial No. 430,456

Claims priority, application Japan May 20, 1953

6 Claims. (Cl. 252—301.4)

This invention relates to a phosphor, particularly to a barium phosphate phosphor which emits bright blue yellowish white or bluish white fluorescence when excited by ultra-violet rays or cathode rays.

A barium phosphate phosphor activated with titanium and added barium fluoride is reported in the Journal of Electrochemical Society, vol. 98, p. 479 (1951), by Messrs. S. T. Henderson and P. W. Ranby. It emits bluish white fluorescence and increases fluorescence in the long-wavelength region and is a little brighter as compared with the hitherto well-known magnesium tungstate phosphor. However, said barium phosphate phosphor is not sufficient in the intensity of fluorescence in the long-wavelength region and is not satisfactory in brightness.

The present invention is concerned with a barium phosphate phosphor which is satisfactory in the above mentioned points.

An object of this invention is to obtain a phosphor which emits stable and highly efficient blue yellowish white or bluish white fluorescence when excited by ultra-violet or cathode rays.

Another object of the invention is to provide a phosphor which can be used as a phosphor for fluorescent lamps which emits bluish white or white fluorescence when used alone or as mixed with one or more other phosphors.

A further object of the invention is to provide a phosphor which is obtained in place of the magnesium tungstate phosphor, and to decrease or entirely dispense with the use of zinc silicate for white fluorescent lamps.

A still further object of the invention is to provide a phosphor which is stable even against excitation by cathode rays and shows several times higher brightness than magnesium tungstate and zinc oxide phosphors and is as bright as the fluorescence of zinc sulphide, and can be used for various cathode ray tubes or magic eyes.

The present invention relates to a barium phosphate phosphor activated with titanium and added strontium fluoride or strontium fluoride and barium fluoride to barium phosphate as a part of the ground material of the phosphor. Not only barium phosphate ($BaHPO_4$) can be used itself, but mixtures of barium oxide, barium carbonate, barium hydroxide or barium nitrate and a phosphorus compound such as ammonium phosphate can be used. The mixture should be in such proportion as will decompose and combine at high temperatures to produce barium pyrophosphate ($Ba_2P_2O_7$). When the composition of barium pyrophosphate ($Ba_2P_2O_7$) varies, the fluorescence efficiency remarkably decreases. According to the researches made by the present inventors, almost no fluorescence emits in the case of such composition as of orthophosphate or metaphosphate or a composition corresponding to the crystal structure barium halo apatite or barium hydroxyl-apatite such as $$3Ba_3(PO_4)_2 \cdot BaF_2, \quad 3Ba_3(PO_4)_2 \cdot Ba(OH)_2$$

It has been recognized that, in case a part or all of barium phosphate is replaced by a bivalent metal such as calcium, zinc, cadmium or magnesium, no fluorescence will emit at all or the intensity of fluorescence will be decreased remarkably. For example, the intensity of fluorescence when 20% of barium was replaced by such metal was less than $\frac{1}{10}$.

The rate of addition of strontium fluoride or a mixture of strontium fluoride and barium fluoride should best be within a range of 0.02 to 0.05 mol per mol of barium phosphate. Especially below this range, the intensity of fluorescence will decrease remarkably, and above this range, the intensity of fluorescence will not decrease but the grains will grow or will be sintered, thereby making the phosphor practically disadvantageous.

As compared with the brightness of a phosphor made by adding about 2 mol percent of strontium fluoride or strontium fluoride and barium fluoride to barium phosphate that of a phosphor without such addition at least will be less than $\frac{1}{2}$. The color of fluorescence will vary with the addition of those two fluorides. The color tone of fluorescence when strontium fluoride alone is added will be blue yellowish white. In case both strontium fluoride and barium fluoride together are added, the color of fluorescence will gradually become bluish and its brightness will gradually decrease. The fluorescence of a phosphor made by adding barium fluoride alone has a bluish white color and is about 20% less bright than that of a phosphor made by adding strontium fluoride alone. Therefore, in case a mixture of both fluorides is added, the color can be varied and the brightness can be increased and stabilized.

If instead of strontium fluoride, one or more fluorides of metals such as calcium, zinc, cadmium, magnesium, lithium, sodium or potassium is used, the intensity of fluorescence will remarkably decrease. Even when strontium chloride or barium chloride is used, the intensity of fluorescence will be less than $\frac{1}{2}$. As the addition of silica does not reduce the intensity of fluorescence, it can be used as a flux. However, such salts as borate, tungstate and molybdate are not useful as fluxes.

Not only titanium oxide but also any of the salts, such as titanium nitrate and titanium carbonate, which will produce titanium oxide when decomposed at high temperatures can be used as the activator. However, when titanium oxide is used, the treatment in preparation will be facilitated. The amount of addition of titanium oxide should preferably be within a range from 0.2 to 0.5 mol per mol of barium phosphate. Out of this range, the efficiency of fluorescence will be reduced. The optimum amount of titanium in the present invention is considerably large as compared with the amount of the activator used in other phosphors and is, for example, 3 to 5 times as large as the amount of addition of antimony used as the activator in the calcium halophosphate phosphor. Whether such a large amount of titanium oxide exists as activator in the base of the phosphor or forms the ground material as combined with barium phosphate is not yet clear. However, as a phosphor prepared without the addition of titanium does not emit fluorescence and the color tone of the fluorescence does not vary but the intensity of the fluorescence varies according to the amount of the addition, titanium is here handled as an activator for the sake of convenience in explanation.

The firing temperature in the preparing of the phosphor of this invention is optimum within a range from 1000 to 1100° C. Out of this range, the efficiency of fluorescence will be reduced. At higher temperatures, the phosphor will sinter. Therefore, heat treatment above said range should be avoided. The time of firing should be about 10 minutes to 2 hours. The firing may be repeated several times. The firing may be in any moderate atmosphere.

In order to have the present invention more clearly understood, examples thereof are given in the following. However, this invention is not to be limited to these examples.

Example 1

| | Mol |
|---|---|
| Barium phosphate (BaHPO$_4$) | 1 |
| Strontium fluoride (SrF$_2$) | 1 |
| Titanium oxide (TiO$_2$) | 0.3 |

Example 2

| | |
|---|---|
| Barium phosphate (BaHPO$_4$) | 1 |
| Strontium fluoride (SrF$_2$) | 0.015 |
| Barium fluoride (BaF$_2$) | 0.015 |
| Titanium oxide (TiO$_2$) | 0.3 |

Example 3

| | |
|---|---|
| Barium phosphate (BaHPO$_4$) | 1 |
| Strontium fluoride (SrF$_2$) | 0.03 |
| Barium fluoride (BaF$_2$) | 0.01 |
| Titanium oxide (TiO$_2$) | 0.3 |

Example 4

| | |
|---|---|
| Barium carbonate (BaCO$_3$) | 1 |
| Ammonium phosphate ((NH$_4$)$_2$HPO$_4$) | 1 |
| Strontium fluoride (SrF$_2$) | 0.03 |
| Titanium oxide (TiO$_2$) | 0.5 |

Example 5

| | |
|---|---|
| Barium carbonate (BaCO$_3$) | 1 |
| Ammonium phosphate ((NH$_4$)$_2$·HPO$_4$) | 1 |
| Strontium fluoride (SrF$_2$) | 0.015 |
| Barium fluoride (BaF$_2$) | 0.015 |
| Titanium oxide (TiO$_2$) | 0.3 |

In each of the above examples, the mixture is fired at 1050° C. for 30 minutes and the phosphors obtained emit blue yellowish white fluorescence.

The phosphor of the present invention has the color of fluorescence and properties very similar to those of the magnesium tungstate phosphor. However, when excited by ultra-violet rays of 2537 A. of mercury, even the phosphor of the present invention made by using strontium fluoride and barium fluoride together has fluorescence whose color is far whiter than that of the magnesium tungstate phosphor and whose brightness is about 10 to 20% higher. The phosphor made by adding only strontium fluoride has a color of fluorescence which is more yellowish as well as white and has brightness of fluorescence which is about 20 to 30% higher, as compared with the magnesium tungstate phosphor. Therefore, the phosphor according to the present invention is not only high in efficiency when used for fluorescent lamps but is also economically advantageous because expensive tungsten need not be used therein and because, even when said phosphor is used as a constituent phosphor for white fluorescent lamps, zinc silicate which is necessary, when the magnesium tungstate phosphor is used, may be decreased in amount or need not be used at all. The phosphor of the present invention is more stable than the magnesium tungstate phosphor, needs no zinc silicate for the white fluorescent lamp which is most unstable, and can thereby make the life of fluorescent lamps longer.

We claim:
1. A barium phosphate phosphor prepared by mixing a member selected from the group consisting of BaHPO$_4$ and of a mixture of a barium compound and

(NH$_4$)$_2$HPO$_4$ in an amount to yield about 1 mol of barium pyrophosphate upon being heated, said barium compound being selected from the group consisting of barium oxide, barium carbonate, barium hydroxide and barium nitrate, with about 0.02 to 0.05 mol of a member selected from the group consisting of strontium fluoride and a strontium fluoride-barium fluoride mixture in a molar proportion of 3:1 to 1:1, and with about 0.2 to 0.5 mol of titanium oxide as activator, and firing the mixture for about 10 minutes to 2 hours at a temperature between 1000° C. and 1100° C.

2. A barium phosphate phosphor prepared by mixing about 1 mol of BaHPO$_4$ with about 0.03 mol of strontium fluoride and with about 0.3 mol of titanium oxide as activator, and firing the mixture for about 30 minutes at a temperature between 1000° C. and 1100° C.

3. A barium phosphate phosphor prepared by mixing about 1 mol of BaHPO$_4$ with about 0.015 mol of strontium fluoride and about 0.015 mol of barium fluoride and with about 0.3 mol of titanium oxide as activator, and firing the mixture for about 30 minutes at a temperature between 1000° C. and 1100° C.

4. A barium phosphate phosphor prepared by mixing about 1 mol of BaHPO$_4$ with about 0.03 mol of strontium fluoride and about 0.01 mol of barium fluoride and with about 0.3 mol of titanium oxide as activator, and firing the mixture for about 30 minutes at a temperature between 1000° C. and 1100° C.

5. A barium phosphate phosphor prepared by mixing about 1 mol of BaCO$_3$ and about 1 mol of (NH$_4$)$_2$HPO$_4$ with about 0.03 mol of strontium fluoride and with about 0.5 mol of titanium oxide, and firing the mixture for about 30 minutes at a temperature between 1000° C. and 1100° C.

6. A barium phosphate phosphor prepared by mixing about 1 mol of BaCO$_3$ and about 1 mol of (NH$_4$)$_2$HPO$_4$ with about 0.015 mol of strontium fluoride and about 0.015 mol of barium fluoride and with about 0.3 mol of titanium oxide as activator, and firing the mixture for about 30 minutes at a temperature between 1000° C. and 1100° C.

References Cited in the file of this patent
UNITED STATES PATENTS

| 2,285,464 | Ruthruff | June 9, 1942 |
| 2,488,733 | McKeag et al. | Nov. 22, 1949 |
| 2,596,509 | Ranby | May 13, 1952 |
| 2,772,241 | Ranby | Nov. 27, 1956 |

OTHER REFERENCES

Henderson: "J. Electrochem. Soc.," December 1951, vol. 98, No. 12, pp. 479–482.